L. W. FRENCH.
RAIN WATER FILTER.
APPLICATION FILED JAN. 27, 1908.
900,510.  Patented Oct. 6, 1908.
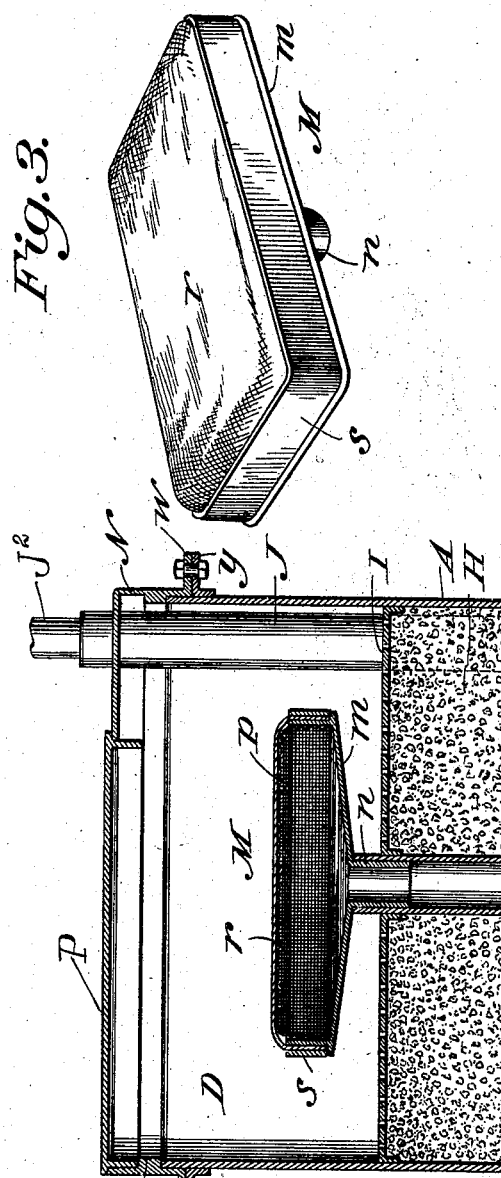
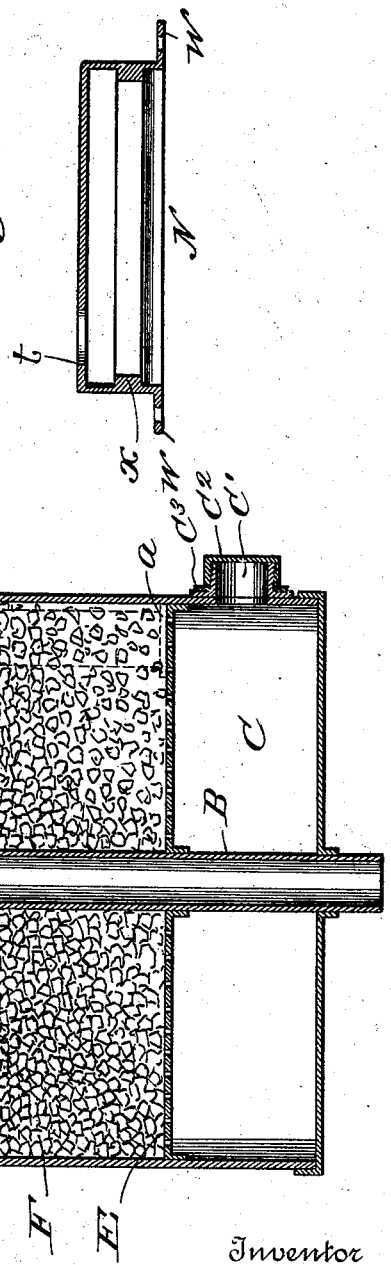

UNITED STATES PATENT OFFICE.

LEROY W. FRENCH, OF HOLTON, KANSAS.

RAIN-WATER FILTER.

No. 900,510.  Specification of Letters Patent.  Patented Oct. 6, 1908.

Application filed January 27, 1908. Serial No. 412,822.

*To all whom it may concern:*

Be it known that I, LEROY W. FRENCH, citizen of the United States, residing at Holton, in the county of Jackson and State of Kansas, have invented certain new and useful Improvements in Rain-Water Filters, of which the following is a specification.

My invention has relation to filters and more particularly to filters adapted to be interposed between down spouts and cisterns with a view of robbing rain water of foreign substances precedent to the storage of the same in cisterns.

One of the objects of the invention is the provision of a simple, compact and inexpensive filter of high efficiency, and one embodying an auxiliary filtering device susceptible of being expeditiously and easily cleared of collected sediment without the employment of skilled labor.

Another object of the invention is the provision of a filter having a reversible top, whereby the filter without change of construction may be fitted on down spouts in different positions relative to buildings.

Other advantageous characteristics peculiar to my invention will be fully understood from the following description and claims when the same are read in connection with the drawings, accompanying and forming part of this specification, in which:

Figure 1 is a vertical section of a filter constituting a practical embodiment of my invention. Fig. 2 is a detail view of the top frame of the filter. Fig. 3 is a perspective view of the auxiliary filtering device of the filter as the same appears when removed from the filter casing.

Similar letters designate corresponding parts in all of the views of the drawings, referring to which:

A is the casing of the filter constituting the best embodiment of my invention known to me, which casing is preferably, though not necessarily, made of sheet-metal. Arranged in the casing and preferably in the vertical center thereof is a pipe B which extends from a point adjacent to the top of the casing, downward through the bottom thereof and is designed to be connected through a pipe (not shown) with a cistern or other storage chamber or a point of use. In the casing A is a suitable body of filtering material which is arranged intermediate a lower water chamber C and an upper water chamber D. The said filtering body may be of any construction compatible with the purpose of my invention without involving departure from the scope of the invention as defined in the claims appended, though I prefer to construct it in the manner illustrated in Fig. 1—that is to say, upon a lower foraminous plate E I arrange a layer F of charcoal or analogous substance and upon said layer F I arrange a second foraminous plate G which is surmounted by a body of gravel H surmounted, in turn, by a third foraminous plate I.

J is an upright pipe removably arranged in the casing A, adjacent to one corner thereof, and extending downward from a point slightly above the top of the casing to the lower foraminous plate E where it is provided with a bead $a$, designed to rest upon the plate as shown in Fig. 1. The said pipe J passes through openings in the foraminous plates I and G, and has for its office to conduct unfiltered rain or other water to the lower chamber C. From said chamber C the water rises through the body of filtering material, which robs it of the major portion of impurities, to the upper chamber D.

From the chamber D, the water is taken for storage in a cistern or for use; and in order to thoroughly clarify and purify the water before the same is let into the discharge pipe B, I provide the auxiliary filtering device M shown in Figs. 1 and 3. The said device M is preferably connected in a detachable manner to the upper end of the pipe B so that it may be expeditiously and easily removed for cleaning and as readily replaced; and it preferably comprises a pan-shaped body $m$ having a depending nipple $n$ for arrangement in the upper end of the pipe B, Fig. 1, an open-work frame $p$ of wire mesh or other suitable reticulated material, the sides of which are arranged, preferably in a removable manner, in the body $m$, a covering $r$, of muslin or other suitable textile material, arranged over the frame $p$ and the sides of the body $m$, and a band $s$ which fits tightly over the covering $r$ to clasp the same against the sides of the body $m$ and serves to retain the said covering r and the wire-mesh frame p in proper position, relative to the body m.

It will be evident from the foregoing that the water in passing from chamber D to pipe B must find its way through the covering r the wire-mesh frame p and the body m of the auxiliary filtering device; and it will also be evident that the covering r will thoroughly remove from the water any foreign substance that may remain therein subsequent to the passage of the water through the before described body of filtering material, and the frame p will support said covering. It will further be seen that while the auxiliary device M is in the casing A as well as when the device is removed from the casing, the covering r of textile material may be readily removed for cleansing after which it may be as readily replaced or else in its place a new piece of cloth may be arranged and secured over the frame p. I prefer to make the frame p removable from the body m in order that said parts may be separated to facilitate cleaning thereof, but it is not necessary that said frame p be removable and, therefore, it may, when deemed expedient, be permanently connected to the body m without involving departure from the scope of my invention as defined in my claims.

N is the top frame of the filter which is preferably of galvanized cast iron. The said frame N is provided with an opening t located near one of its corners; and it is also provided with apertured lugs w and an interior rib x. The apertured lugs w are designed to be opposed to and detachably connected through bolts with corresponding lugs y on the casing A, while the interior rib x is arranged to bear on the upper end of the casing A and serve as a rest for the flanged cover P which is removable in order that access may be readily gained to the chamber D and the auxiliary filtering device M when occasion demands.

As will be readily gathered from the foregoing the top frame N is adapted to be changed in position on the casing A, this and the location of the opening t, which is preferably circular, near one corner of the top frame being advantageous since it renders it feasible to place filter at either corner of a building on the same side. The downspout $J^2$ on a building is preferably telescoped in the upper end of the pipe J, Fig. 1, after the manner shown in said figure. It will further be noted in this connection that the pipe J passes through openings in the foraminous plates G and I, as before stated, and said plates may be removed and replaced in changed position when occasion demands to receive said pipe J.

In the practical use of my novel filter, the water passes down the pipe J to the chamber C, then up through the foraminous plates and filtering materials to the chamber D, then through the auxiliary filtering device M, and then through the pipe B to a cistern or other place of storage or use, and during the passage stated all foreign substance will be effectually removed from the water with the result that the water delivered by the pipe B will be in a pure, wholesome state.

As shown in Fig. 1 the chamber C is preferably provided with a clean-out opening $C^1$ normally closed by a removable screw cap $C^2$, and an interposed washer $C^3$. When the said cap is removed the chamber C may obviously be expeditiously and easily cleared of collected sediment.

Having described my invention, what I claim and desire to secure by Letters Patent is:

1. The combination in a filter, of a casing, a top frame removably arranged and adapted to be changed in position on the casing and having an opening adjacent to one of its corners, a lower foraminous plate supported in the casing above the lower end thereof to form a lower chamber in the casing, filtering material arranged on said plate, an upper foraminous plate removably arranged in the casing and on the filtering material to form an upper chamber in the casing and having an opening adjacent to one of its corners, a discharge pipe arranged in the casing and extending from the upper chamber down through the upper foraminous plate, and a pipe extending down through the corner openings in the top frame and upper foraminous plate and the filtering material and bearing at its lower end on the lower foraminous plate; said upper foraminous plate and second named pipe being adapted to be changed in position in the casing when the top frame is changed in position on said casing, for the purpose set forth.

2. The combination in a filter, of a casing, a top frame removably arranged and adapted to be changed in position on the casing and having an opening, and an interior flange resting on the casing and also having an opening adjacent to one of its corners, a cover removably arranged in the first named opening of the top frame and on the flange thereof, a lower foraminous plate supported in the casing above the lower end thereof to form a lower chamber in the casing, filtering material arranged on said plate, an upper foraminous plate removably arranged in the casing and on the filtering material to form an upper chamber in the casing and having an opening adjacent to one of its corners, a discharge pipe arranged in the casing and extending from the upper chamber down through the upper foraminous plate, an auxiliary filter arranged in the upper chamber and on said pipe, and a pipe extending down through the corner openings in the top frame and upper foraminous plate and the filtering material and bearing at its lower end on the lower foraminous plate.

In testimony whereof I affix my signature in presence of two witnesses.

LEROY W. FRENCH.

Witnesses:
W. I. WOLVERTON,
ARNOLD SINNING.